Jan. 3, 1967 R. E. HARVEY 3,295,509
BARBECUE STARTER AND BURNER APPARATUS
Filed Oct. 22, 1964 5 Sheets-Sheet 2

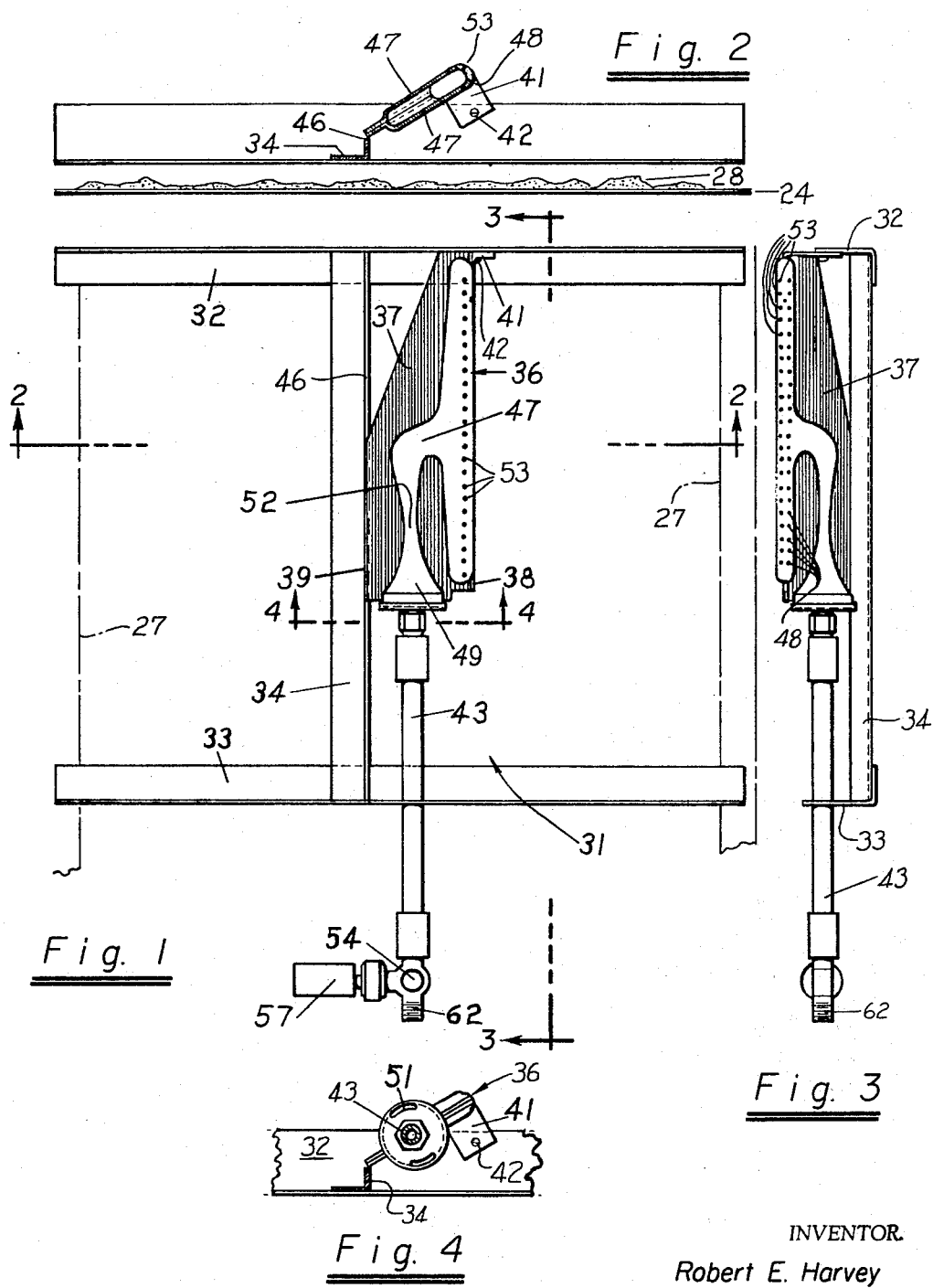

INVENTOR.
Robert E. Harvey
BY
Attorneys

Jan. 3, 1967 R. E. HARVEY 3,295,509
BARBECUE STARTER AND BURNER APPARATUS
Filed Oct. 22, 1964 5 Sheets-Sheet 3
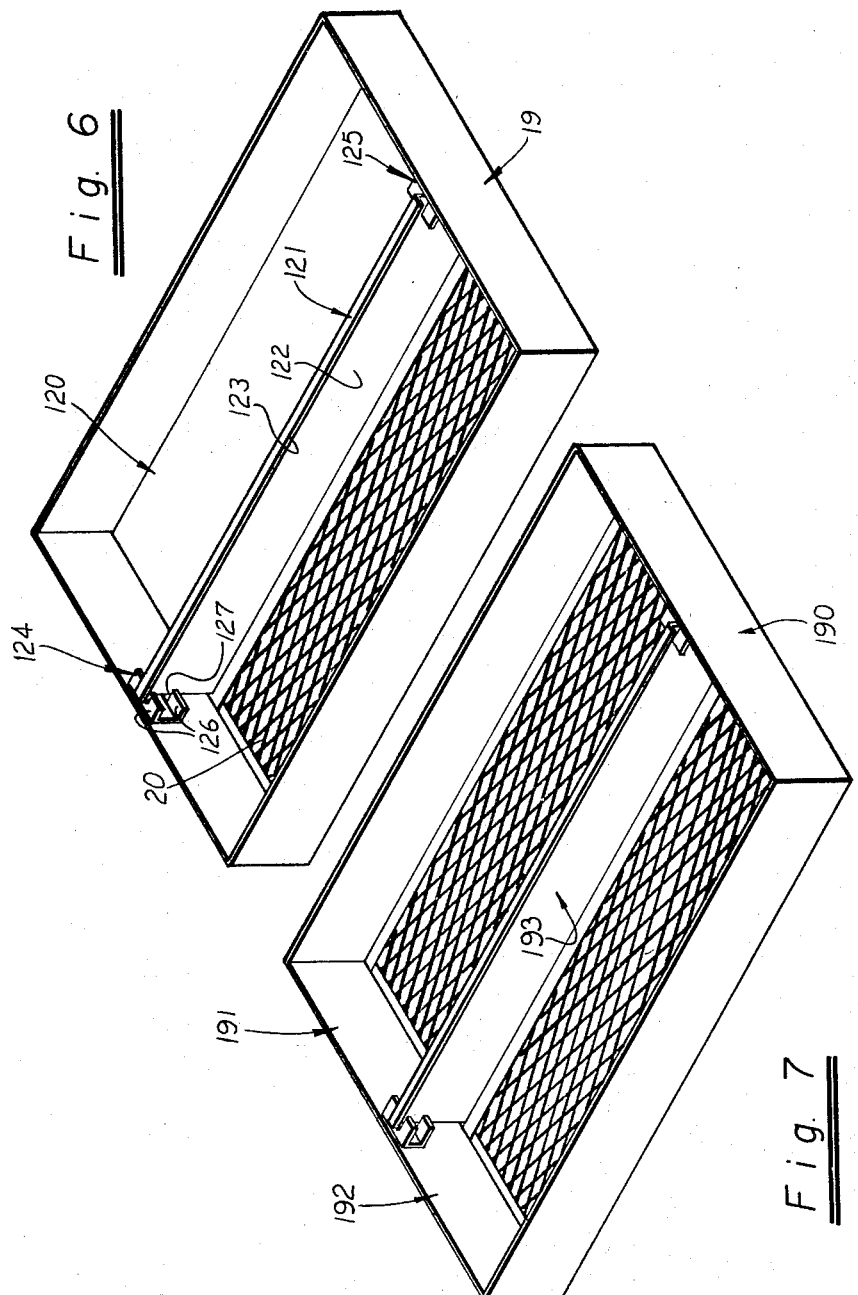
INVENTOR.
Robert E. Harvey
BY 
Attorneys INVENTOR.
Robert E. Harvey Jan. 3, 1967 R. E. HARVEY 3,295,509
BARBECUE STARTER AND BURNER APPARATUS
Filed Oct. 22, 1964 5 Sheets-Sheet 5

INVENTOR.
Robert E. Harvey
BY
Attorneys

United States Patent Office 3,295,509
Patented Jan. 3, 1967

3,295,509
BARBECUE STARTER AND BURNER APPARATUS
Robert E. Harvey, Hillsborough, Calif., assignor to Goodwin of California Incorporated, Berkeley, Calif., a corporation of California
Filed Oct. 22, 1964, Ser. No. 405,663
6 Claims. (Cl. 126—25)

This invention relates to cooking grills and associated cooking apparatus and is more particularly related to such apparatus employing a gas burner for starting charcoal briquettes or the like or for maintaining a constant flame through non-consumable briquettes.

In general, it is an object of the invention to provide an improved barbecue apparatus of the kind noted above.

Another object of the invention is to provide an improved gas burner apparatus.

These and other objects of the invention will be more readily apparent from the following description of a preferred embodiment when taken in conjunction with the accompanying drawing in which:

FIGURE 1 is a plan view of a gas burner assembly according to the present invention;

FIGURE 2 is a section of FIGURE 1 taken along the line 2—2 thereof;

FIGURE 3 is a section of FIGURE 1 taken along the line 3—3 thereof;

FIGURE 4 is a section view taken along the line 4—4 of FIGURE 1;

FIGURES 6 and 7 are isometric views of trays employed in the embodiments of FIGURES 5 and 12 respectively;

Figure 5:
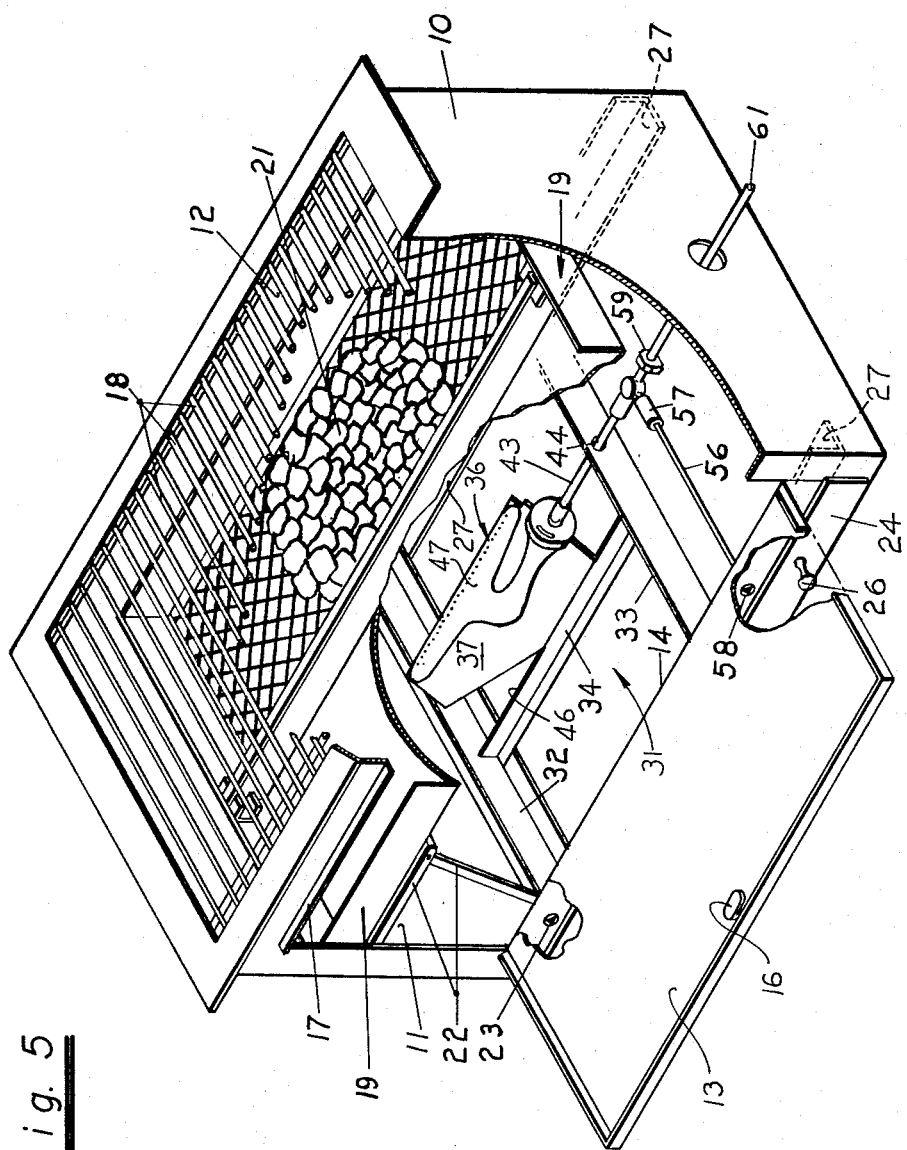
FIGURE 5 is an isometric view of barbecue apparatus according to the present invention.
Figures 8, 9, 10, 11:
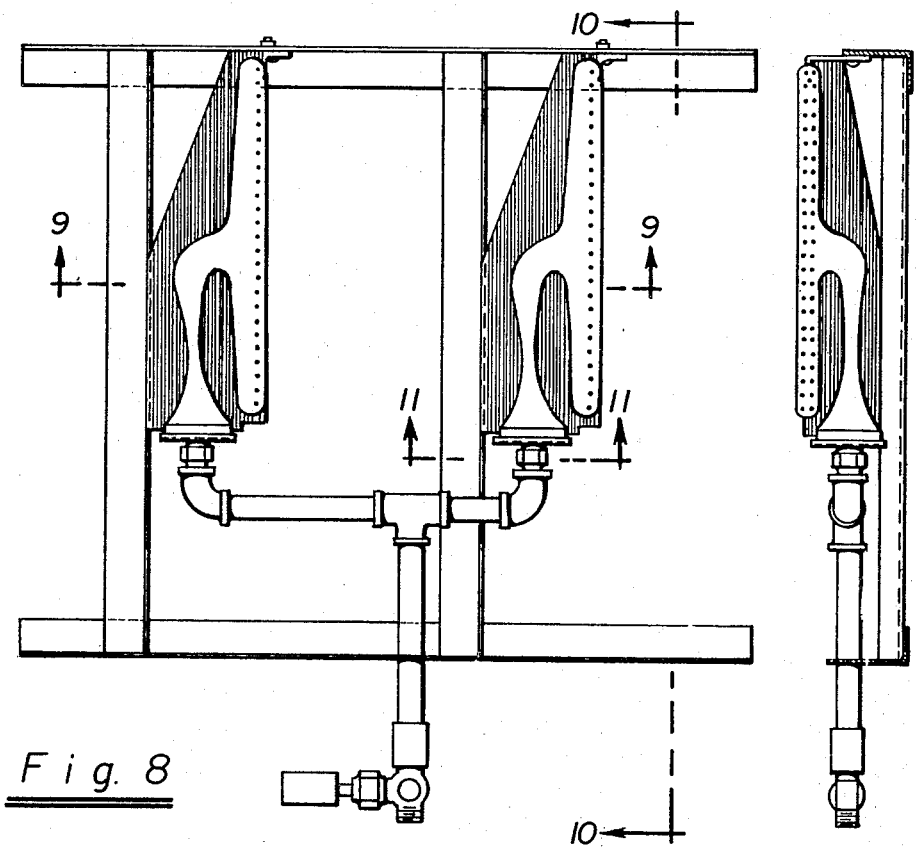
FIGURES 8–11 show a dual burner assembly in views comparable respectively to FIGURES 1–4.

As shown in FIGURE 5 a barbecue broiler is provided having a rectilinear firebox including a pair of end walls 10, 11, a back wall 12, and a front wall including the drop-front door 13 hinged along its lower edge 14. Door 13 includes a latch 16 of common construction whereby when the door 13 is closed, latch 16 can be turned to extend upwardly into an opening (not shown) formed in the outwardly protruding ledge 17.

The top of the firebox is defined by a grill 18 suitably secured thereto, and removable for cleaning.

The tray 19 holds a bed of coals 21 and is movable between advanced and retracted positions by raising and lowering means of a conventional construction such as the parallelogram linkage 22 at each end thereof (shown herein only at one end for clarity). Tray 19 rests unattached on the raising and lowering means whereby it can be readily removed if desired. Linkage 22 is operated by inserting a handle (not shown) having a triangular stem into a triangular socket 23 disposed generally flush with the front of the firebox so as not to protrude particularly. Cranking the handle in one direction serves to raise the tray 19 upwardly and cranking the handle in the opposite direction serves to lower it to properly position the bed of coals with respect to the grill.

Tray 19 is provided with a bottom including a perforate region and an imperforate region. Preferably the two regions are separated by a removable partition. The partition serves to permit a bed of coals 21 to be localized in the tray and thereby minimize their consumption while maintaining concentration of heat. The perforate region is disposed directly above a burner assembly 31 described below. Thus the two regions form an ignition zone and a cooking zone within the tray. The consumable coals can be ignited in the perforate zone and then be removed to the imperforate zone. This has the advantage that the coals can burn down and be completely consumed without dropping through the perforate bottom.

More particularly, as shown in FIGURE 6, the perforate region 20 is provided by a material, such as expanded metal. The imperforate region 120 is formed by a suitable metal, and the regions 20, 120 are separated by the removable partition 121.

Partition 121 is simply formed as an upright metal sheet 122 bent over along its upper edge to form a transverse lip 123 which can be easily gripped. A pair of brackets 124, 125 are secured to opposite ends of the tray 19 and are each arranged to slidably engage an end of sheet 122. Thus, each bracket 124, 125 includes a pair of tabs 126 formed with a notch 127. Tabs 126 are generally bent to extend parallel to the plane of the bottom. Notches 127 are aligned to define a "groove" to receive an end of sheet 121.

With the foregoing tray construction a bed of coals in the ignition zone 20 can be ignited by a single burner assembly 31, described further below, and after ignition the bed can be transferred into the perforate cooking zone 120. Conveniently, during such transfer the partition 121 can be raised or removed and then replaced to confine the bed to the cooking zone 120. In order to remove ashes and the like from the firebox, a drawer 24 is arranged to slide into and out of the front of the firebox, the bottom of the drawer serving to catch the falling ashes. Suitable knobs 26 are attached to the drawer.

A pair of elongated ledges 27 are fixed inside the firebox along the front and back wall.

The plane defined by ledges 27 is disposed somewhat spaced above the bottom of drawer 24, for example, on the order of 1½ to 2 inches. As shown in FIGURE 2 the bottom of drawer 24 will normally have an accumulation of ashes or the like 28 thereon, unless recently cleaned.

A gas burner assembly 31 includes a three piece framework comprising a pair of spaced parallel support bars, such as the angle iron members 32, 33 and a spreader bar 34 which extends between the support bars 32, 33 to maintain the spacing between them. The ends of support bars 32, 33 lie in a plane and are formed and dimensioned to be supported so as to dispose the plane of the framework in parallel, closely spaced relation above the bottom of the firebox. Thus the ends of bars 32, 33 are dimensioned to ride loosely upon ledges 27 and thereby support the plane of the framework somewhat above the bottom of the firebox.

A burner 36 extends between the suport bars 32, 33 and comprises an elongated vane 37. Vane 37 lies generally in a plane tipped at a modest angle to the horizontal on the order of 30° so as to dispose the side edge 38 above side edge 39. The side edges 38, 39 of vane 37 extend transversely of the support bars, the burner being thereby oriented generally at right angles.

The vane is formed at one end with a tab 41 which is bent normal to the general plane of the vane and is secured by a screw 42 to the upwardly extending component of support bar 32. The bottom edge 39 of vane 37 rests loosely upon the upwardly extending component of spreader bar 34. The opposite end of vane 37 from tab 41 is supported by a gas supply line 43 extending through a hole 44 formed through the upwardly extending component of support bar 33.

As thus arranged the angle of vane 37 can be adjustably established as desired. It has been found preferable, however, to locate screw 42 at a generally desired height above the upper edge 46 of spreader bar 34 so that the burner can rest unattached upon spreader bar 34. Thus, as the heat within the firebox increases, expansion and contraction of the members will not tend to cause any damage therebetween.

Vane 37 is formed by a pair of members each of which is stamped to include one-half of an elongated gas manifold 47 extending along the upper side edge 38 of vane 37. A series of burn holes 48 is disposed in a line along edge 38 of the vane and located beneath the plane of the vane for discharging gas to be burned.

Each of the pair of vane members is also formed to include one-half of a mixing chamber 49 having adjustable ports 51 for admitting air in various degrees to be mixed with gas being supplied along pipe 43. The swirl of air and gas is forced out of chamber 49 in a converging stream through the throat 52 likewise formed in halves by each of the vane members. Throat 52 delivers the air-gas mixture substantially to the mid-point of the line of burn holes 48. This has been found particularly advantageous inasmuch as it provides a minimum pressure drop at those burn holes 48 located at the ends of the manifold 47 as compared to those burn holes 48 located substantially midway between the ends of the manifold.

This relatively uniform pressure distribution of the discharging mixture is particularly advantageous when providing a second series of burn holes 53 parallel to the first but disposed above the plane of the vane 37. All of these additional upper burn holes receive sufficient pressure so as to resist the tendency to incur an accumulation of grease and ashes therein. The series of burn holes 48 located below the plane of the vane are protected from such accumulation of grease and ashes, not only by the uniformly applied gas pressure but also by their protected location beneath the plane of vane 37.

Means for supplying gas to the mixing chamber 49 includes, in addition to pipe 43, a needle valve 54. Valve 54 is located in protected disposition within the firebox and is operated by a reach rod 56 coupled to the valve by means of a swivel 57. Reach rod 56 terminates in a socket 58 generally flush with the outer face of the firebox. Socket 58 is adapted to receive a handle (not shown) keyed into same for rotation of the reach rod 57. A gas supply line 61 is coupled by a suitable union 59 which serves to permit line 61 to be firmly secured to the threads 62 while permitting the burner assembly 31 to remain in a horizontal plane.

The needle valve 54 controls the flow of fuel gas in a most positive manner thereby eliminating the source of many leaks frequently found in apparatus of this general class.

The angle of vane 37 with respect to the horizontal and the adjacency of the lower edge 39 with respect to the bottom of the firebox serve to cause air to be drawn upwardly beneath the vane toward the burn holes when the burner is ignited. This flow of air upwardly across the burn holes provides an advantageous burner action.

From the foregoing it will be readily evident that there has been provided an improved burner assembly and barbecue apparatus wherein a bed of consumable coals 21 can be readily ignited by lowering the tray 19 into a position adjacent the burner after the burner itself has been lighted.

In those instances where a bed of nonconsumable coals is to be employed, the burner assembly can be located immediately underneath, and provide a gas flame through, the coals, in the style of that type apparatus employing ceramic or other heat resistant material. In this instance, as shown in FIGURE 12, it is preferable to add a second burner substantially parallel to the first with the provision of an additional spreader bar 34' which can serve to support the lower edge of the additional vane 37'.

Figure 12:
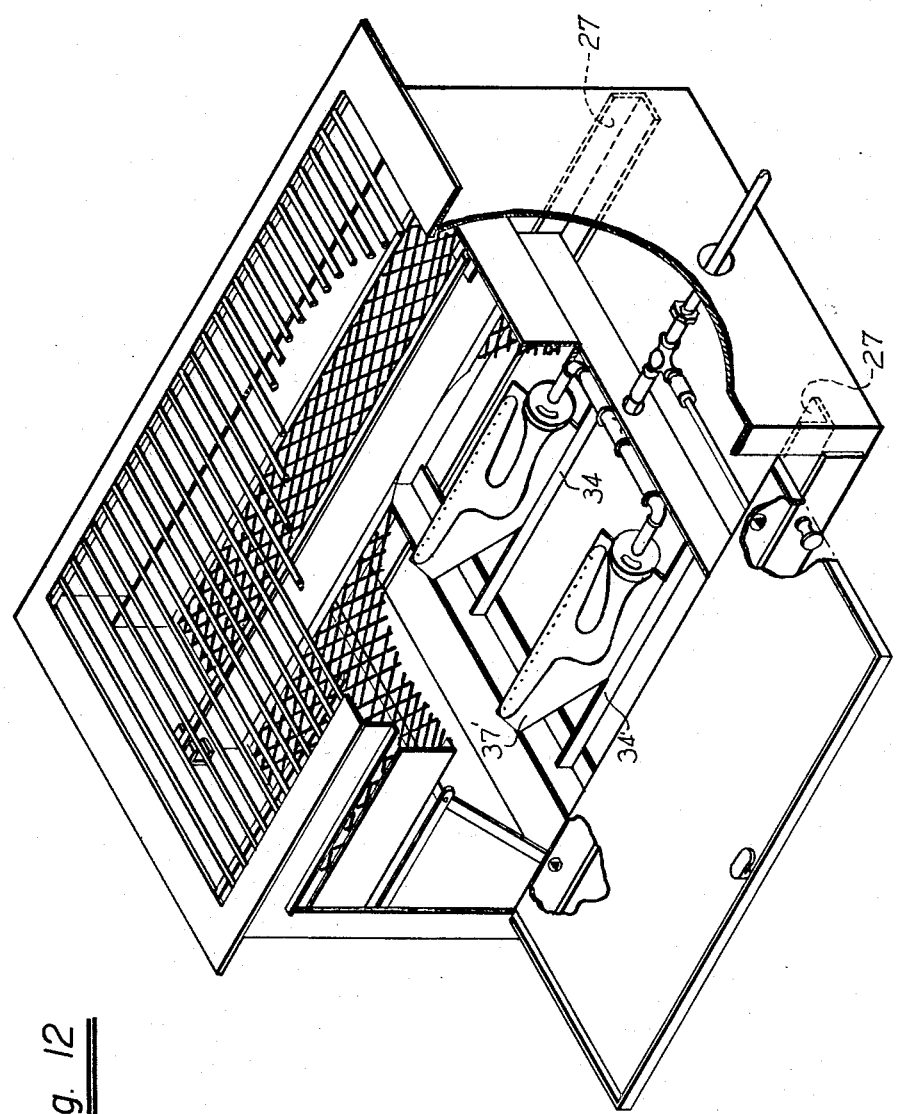
FIGURE 12 is an isometric view of barbecue apparatus according to another embodiment of the invention.

In the embodiment shown in FIGURE 12 a tray 190 is provided with a pair of briquette receiving zones 191, 192 each formed with a perforate bottom and adapted to contain a bed of non-consumable coals in each. The two zones are separated by a removable partition 193 similar in construction to partition 121 and held in place in the same manner.

As shown in FIGURE 12 each of the zones 191, 192 is associated directly above a burner assembly of the kind described above whereby their respective flames can penetrate an associated bed of ceramic coals.

From the foregoing it will be readily evident that small or large beds of coals can be employed with the tray 190 by means of the separate zones 191, 192.

I claim:

1. Gas burner apparatus for use in a firebox, said apparatus comprising a pair of spaced parallel support bars, a spreader bar extending between the support bars to maintain the spacing therebetween, the ends of the support bars lying in a plane and formed to be supported to dispose the plane in parallel closely spaced relation above the bottom of the firebox, a burner assembly supported to extend between the support bars, said burner comprising an elongated vane lying generally in a plane tipped at a modest angle to the horizontal and disposing one side edge above the other, said side edges extending transversely of said support bars, a series of burn holes in a line along the upper edge of the vane and beneath the plane of the vane for discharging gas to be burned thereat, an elongated gas manifold extending along the upper side edge of the vane and in gas communication with said burn holes to supply same with a mixture of air and fuel gas, means for mixing air and fuel gas and for feeding the mixture to said manifold, and valve means disposed to control the flow of fuel gas to said mixing means, the angle of the plane of said vane and the adjacency of the lower side edge thereof with respect to the bottom of the firebox serving to cause air to be drawn upwardly beneath the vane toward the burn holes when said burner is ignited.

2. In a barbecue broiler having a rectilinear firebox and a grill defining the top thereof, tray means for holding a bed of coals, said tray having a perforate bottom, a pair of elongated ledges inside the firebox disposed along the front and back wall thereof, a gas burner assembly supported by said ledges, said burner assembly comprising a pair of spaced parallel support bars, a spreader bar extending between the support bars to maintain the spacing therebetween, the ends of the support bars resting loosely upon said ledges, a burner supported to extend between the support bars, said burner comprising an elongated vane lying generally in a plane tipped at a modest angle to the horizontal and disposing one side edge above the other, said side edges extending transversely of said support bars, a first and second series of burn holes each disposed in a line along the upper edge of the vane, one of said series of burn holes being beneath the plane of the vane and the other above the plane of the vane, the lower side edge being disposed adjacent and spaced from the bottom of the firebox to draw air upwardly beneath the vane toward said one of said series of burn holes, said burn holes serving to discharge gas to be burned, an elongated gas manifold extending along the upper side edge of the vane and in gas communication with said burn holes to supply same with a mixture of air and fuel gas, means for mixing air and fuel gas and feeding the mixture to said manifold, and valve means disposed to control the flow of fuel gas to said mixing means.

3. In a barbecue broiler having a rectilinear firebox and a grill defining the top thereof, tray means for holding a bed of coals, said tray having a perforated bottom region, a pair of elongated ledges inside the firebox disposed along the front and back wall thereof, a gas burner assembly supported by said ledges, said perforate bottom region defining an ignition zone for a bed of consumable coals therein, said ignition zone being disposed directly above said burner assembly, said tray means further including an imperforate bottom region defining a cooking zone, and an upwardly extending partition disposed between said zones, said burner assembly comprising a pair of spaced parallel support bars, a spreader bar extending between the support bars to maintain the spacing therebetween, the ends of the support bars resting loosely upon said ledges, a burner supported to extend between the support bars, said burner comprising an elongated vane lying generally in a plane tipped at a modest angle to the horizontal and disposing one side edge above the other, said side edges extending transversely of said support bars, a first and second series of burn holes each disposed in a line along the upper edge of the vane, one of said series of burn holes being beneath the plane of the vane and the other above the plane of the vane, said burn holes serving to discharge gas to be burned, an elongated gas manifold extending along the upper side edge of the vane and in gas communication with said burn holes to supply same with a mixture of air and fuel gas, means for mixing air and fuel gas and feeding the mixture to said manifold, and valve means disposed to control the flow of fuel gas to said mixing means.

4. In a barbecue broiler having a rectilinear firebox and a grill defining the top thereof, tray means for holding a bed of coals, said tray having a perforate bottom, a pair of elongated ledges inside the firebox disposed along the front and back wall thereof, a gas burner assembly supported by said ledges, said burner assembly comprising a pair of spaced parallel support bars, a spreader bar extending between the support bars resting loosely upon said ledges, a burner supported to extend between the support bars, said burner comprising an elongated vane lying generally in a plane tipped at a modest angle to the horizontal and disposing one side edge above the other, said side edges extending transversely of said support bars, a first and second series of burn holes each disposed in a line along the upper edge of the vane, one of said series of burn holes being beneath the plane of the vane and the other above the plane of the vane, said burn holes serving to discharge gas to be burned, an elongated gas manifold extending along the upper side edge of the vane and in gas communication with said burn holes to supply same with a mixture of air and fuel gas, means for mixing air and fuel gas and feeding the mixture to said manifold, and valve means disposed to control the flow of fuel gas to said mixing means, said valve means comprising a needle valve disposed within the protection of the firebox, a reach rod coupled at one end to operate the valve extending to the front of the firebox, and a socket, adapted to receive an operating handle, carried in the front wall of the firebox and coupled to rotate said reach rod.

5. In a barbecue broiler having a rectilinear firebox and a grill defining the top thereof, tray means for holding a bed of coals, said tray having a perforate bottom region, support means inside the firebox disposed along the front and back wall thereof, a gas burner assembly resting loosely upon and supported by said support means, said perforate bottom region defining an ignition zone for a bed of consumable coals therein, said ignition zone being disposed directly above said burner assembly, said tray means further including an imperforate bottom region defining a cooking zone, and an upwardly extending partition disposed between said zones, said burner assembly comprising a frame including support bars and a burner supported thereby to extend between the first named support means, said burner comprising an elongated vane, the side edges thereof extending transversely of said support means, a series of burn holes disposed in a line along the edge of the vane, said burn holes serving to discharge gas to be burned, means for mixing air and fuel gas and feeding the mixture to said burn holes, and valve means disposed to control the flow of fuel gas to said mixing means.

6. Barbecue broiler apparatus according to claim 3 wherein said partition is removably supported by said tray means to facilitate transfer of a bed of coals from said ignition zone to said cooking zone and for confining said bed to one or the other.

References Cited by the Examiner
UNITED STATES PATENTS

| | | | |
|---|---|---|---|
| 2,670,790 | 3/1954 | Marble | 158—116 |
| 2,790,434 | 4/1957 | Del Francia | 126—25 X |
| 2,855,032 | 10/1958 | Hahn | 158—116 |
| 3,152,586 | 10/1964 | Russell | 126—25 X |
| 3,191,592 | 6/1965 | Lorbacher | 126—25 |

FREDERICK L. MATTESON, JR., *Primary Examiner.*

E. G. FAVORS, *Assistant Examiner.*